May 12, 1959
G. H. PEDERSEN
2,885,856
APPARATUS FOR INCREASING COMPRESSOR PRESSURE
RATIOS IN A GAS TURBINE ENGINE
Filed March 23, 1956
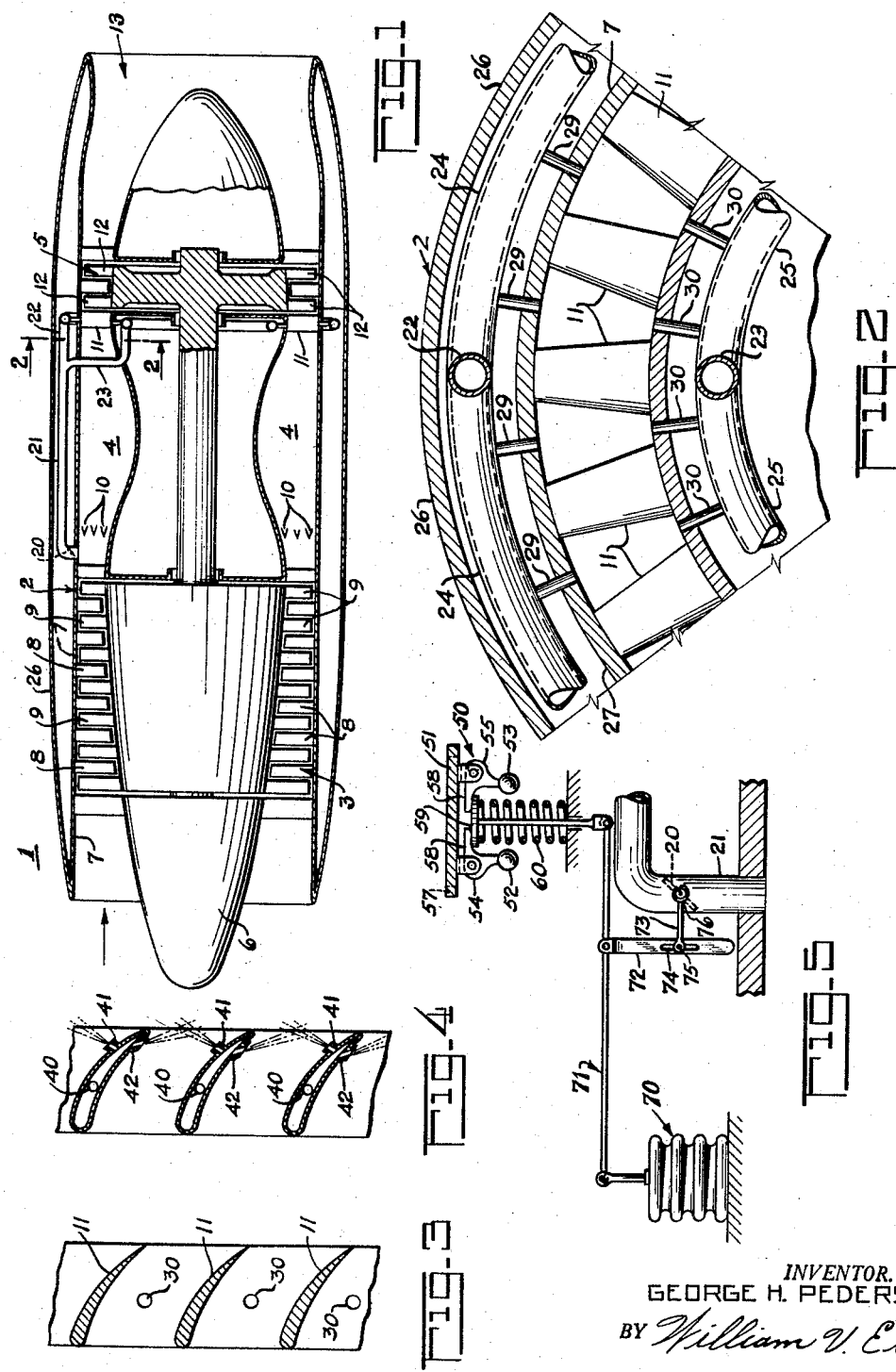
INVENTOR.
GEORGE H. PEDERSEN
BY William V. Ebs
his ATTORNEY

United States Patent Office 2,885,856
Patented May 12, 1959

2,885,856

APPARATUS FOR INCREASING COMPRESSOR PRESSURE RATIOS IN A GAS TURBINE ENGINE

George H. Pedersen, Pines Lake, N.J., assignor to Curtiss-Wright Corporation, a corporation of Delaware Application March 23, 1956, Serial No. 573,564

3 Claims. (Cl. 60—39.25)

My invention relates to gas turbine engines and is particularly directed to apparatus for increasing compressor pressure ratios over a portion of the operating range of such an engine.

The compressor of a gas turbine engine should ideally provide compression ratios which are high enough for good thermal efficiency and low enough to allow for satisfactory engine acceleration characteristics. Reasonably satisfactory compressor performance is readily provided by proper design over a portion of the operating range of an engine. However, for any particular value of ambient temperature there is a determinable engine speed of rotation beyond which compressor pressure ratios will increasingly fall off from ideal values unless special compensating measures are taken to avoid this result.

Mechanical devices of various sorts have been employed in the past for the purpose of increasing compressor pressure ratios over a portion of the operating range of the engine. Use has been made for example of variable compressor inlet guide vanes, variable compressor stator blades, variable exhaust nozzles and variable turbine stator blades. Such mechanical features however have the disadvantage of complicating the construction of the engine. Furthermore the speed of response of mechanical devices is less than may be desired. I propose to provide increased compressor pressure ratios in an improved manner without the disadvantages inherent in the mechanical systems of the past.

It is a prime object of my invention to effect increases in compressor pressure ratios in a gas turbine engine by decreasing the effective area between turbine stator blades with jets of compressed air or other fluid injected into the gas stream flowing through the turbine stator.

It is another object of my invention to provide for the control of the aforesaid jets of compressed air or other fluid in such a manner that reasonably high compressor pressure ratios are maintained over the operating range of the engine.

Other objects of the invention will become apparent upon reading the annexed detailed description in connection with the drawing in which:

Fig. 1 is a schematic view of a gas turbine engine embodying features of the invention.

Fig. 2 is an enlarged fragmentary sectional view taken substantially on the plane of the line 2—2 of Fig. 1 and showing the first stage of turbine stator blades.

Fig. 3 is a schematic development showing the turbine stator blades of Fig. 2 in section.

Fig. 4 is a view similar to Fig. 3 showing a modified form of turbine stator blade.

Fig. 5 is a schematic view showing control means for carrying out the invention.

Referring to Fig. 1 of the drawing, a turbo-jet power plant 1 is schematically shown as comprising a housing 2 within which an axial flow multi-stage air compressor 3, a combustion chamber 4 and a turbine 5 are mounted. As indicated the compressor 3 is drivably connected to the turbine 5 for operation by the turbine. The engine is supplied with air through an annular space between a nose section or centerbody 6 and the housing inner wall 7. This air moves downstream between the compressor stator and rotor blades generally indicated by reference characters 8 and 9 respectively, and is delivered at high pressure to the combustion chamber for combustion with fuel supplied to said chamber by burner apparatus 10. The resulting combustion gases and excess air drive the turbine, and in the process pass between the turbine stator and rotor blades generally indicated by reference characters 11 and 12 respectively from whence said gases discharge rearwardly through a nozzle 13 to provide the power plant with forward propulsive thrust. The structure of the power plant 1 so far described is conventional.

As has been indicated, there is a need for increasing compressor pressure ratios over a portion of the operating range of the engine. According to the invention increased pressure ratios are provided by injecting jets of compressed air between the blades of the first stage of the turbine stator to reduce the effective area between such blades. This restricts the flow of gases through the turbine and results in an increase of pressure at the outlet of the compressor to thereby increase the compressor pressure ratio. The amount of compressed air required to provide a satisfactory pressure ratio for a particular operating condition depends upon engine speed and ambient temperature, and suitable mechanism controlled according to variations in these factors is provided for regulating the jets of compressed air injected between the turbine blades.

In carrying out the invention, compressed air is bled from within the engine housing 2, as for example at the outlet end of the compressor according to the operation of valve 20 which is controlled in a manner hereinafter described. The air flows through a conduit 21 having branches 22 and 23, and thence through circular lines 24 and 25 respectively. As shown line 24 is disposed between the outer wall 26 and inner wall 7 of housing 2, whereas line 25 is located within the engine. Air flowing through lines 24 and 25 passes into oppositely disposed radially extending pipe segments 29 and 30 respectively. Jets of compressed air issue from the segments 29 and 30 into the gas stream in the spaces between the first stage of turbine blades. These jets reduce the effective area between the blades for the passage of combustion gases, and thereby increase pressure upstream at the outlet of the compressor 3 to result in an increased compressor pressure ratio. The increase in pressure ratio due to the jets of compressed air is dependent upon the position of valve 20. Opening the valve 20 to admit more air to the compressed air lines results in greater increases in pressure ratio, whereas closing the valve has the opposite effect.

An alternative construction to that described for decreasing the effective area for the passage of gases between turbine stator blades is shown in Fig. 4. In this modified form of the invention the use of hollow blades is contemplated. Compressed air is bled from within the engine housing as in the form of the invention already described. This air is fed through suitable conduits connecting at 40 with hollow first stage turbine stator blades. Each such blade is provided with a pair of nozzles 41 and 42. As shown, the nozzles are located on opposite sides of the blades. Air entering the hollow blades issues from the nozzles into opposite sides of the gas stream between adjacent blades to reduce the effective area for the passage of combustion gases, and thereby bring about an increased compressor pressure ratio.

Mechanism for regulating the compressed air jets in either of the described forms of the invention is shown in Fig. 5. Regulation is effected according to engine r.p.m. and ambient temperature. For the purpose of detecting engine speed there is provided a governor 50 having a rotatable drum 51 on which governor flyweights 52 and 53 are pivotally mounted by linkages 54 and 55 respectively. The drum 51 may be provided with external gear teeth 57 for meshing with an engine driven gear. Any suitable driving connection may be provided between the engine shaft and drum 51 such that the drum is driven at a speed which is proportional to the rotative speed of the compressor. The flyweights 52 and 53 have arms 58 engaged under a member 59 for moving such member against a spring 60 as the flyweights are moved outwardly in response to an increase in their rotative speed.

Ambient temperature is measured by a liquid operated bellows 70 which expands upon an increase in temperature and contracts upon a decrease in temperature. The bellows should be exposed to the outside atmosphere so that it can reflect changes in ambient temperature. As shown in the drawing, the bellows 70 connects to one end of a lever arm 71 while the governor member 59 connects to the other end of the lever arm 71. The lever arm 71 connects by means of the linkage 72 with an arm 73. As shown linkage 72 is provided with a slot 74 which receives a pin 75 on the arm 73 such that the linkage 72 is slidable for some distance with respect to the arm. The arm 73 which is pivotally mounted on conduit 21 at the opposite end from pin 75 controls the position of valve 20. Said arm is biased by helical spring 76 to a position in which valve 20 is closed. The valve is opened by moving arm 73 in a counterclockwise direction.

The described mechanism of Fig. 5 is shown in the condition in which it exists before the engine is set into operation. At this time valve 20 is closed, the governor is at rest, and other elements of the mechanism of Fig. 5 are in positions such that pin 75 of arm 73 occupies an intermediate position in slot 74. When the engine is set into operation the flyweights 52 and 53 of governor 50 swing outwardly moving member 59 in a downward direction. Lever arm 71 pivots in a clockwise direction about the one end above bellows 70 and linkage 72 slides downwardly on the pin 75. At a predetermined engine r.p.m. depending upon the particular ambient temperature pin 75 is engaged by linkage 72 at the upper end of slot 74. Further increases in engine speed cause linkage 72 to move the arm 73 which pivots in a counterclockwise direction to open valve 20 and admit air to conduit 21 from within the engine casing. The admitted air is injected into the spaces between the first stage turbine stator blades to decrease the effective area between such blades for the passage of gases and thereby bring about an increased compressor pressure ratio. The quantity of air admitted to conduit 21 and the resulting compressor ratio is determined for a particular ambient temperature according to engine speed.

An increase in ambient temperature expands bellows 70 moving lever arm 71 upwardly. Linkage 72 is moved upwardly by the lever arm to cause the arm 73 to move in a clockwise direction about the end below governor 50 and valve 20 is moved toward a closed position. The quantity of air admitted to conduit 21 for injection between the turbine stator blades is therefore decreased and the compressor pressure ratio decreases. A decrease in ambient temperature of course has the opposite effect.

As has been pointed out hereinbefore it is desirable to provide increased pressure ratios in a gas turbine for engine speeds in excess of a determinable value which is dependent upon ambient temperature. It will now be appreciated that such increased pressure ratios may be provided in a very simple manner without complicated mechanical devices according to the invention with jets of compressed air injected into the spaces between the first stage turbine stator blades. The desired increase in compressor pressure ratio for a particular operating condition is a function of engine speed and ambient temperature, and suitable mechanism which is responsive to these factors is provided for maintaining satisfactory compressor ratios. By suitable proportionment of the parts of such mechanism pressure ratios may be maintained according to any desired schedule. Since reasonably high compressor pressure ratios are readily provided in a gas turbine engine at the lower engine speeds, and satisfactory pressure ratios not normally provided at higher speeds may be obtained according to the invention good compressor performance may be provided over the operating range of the engine.

It will be understood that the invention is not limited to specific details of construction and arrangement thereof illustrated, and that changes and modifications may occur to one skilled in the art without departing from the spirit of the invention. In particular it is pointed out that while reference has been made to the use of two jets between each of the first stage stator blades for decreasing the effective area for the passage of gases, a single jet or any other number of jets might be used. Furthermore, although the invention has been described in the environment of a single spool turbo-jet engine obviously the proposed construction is also adaptable to a twin spool turbo-jet engine. In the case of a twin-spool engine jets of compressed air might be injected into the spaces between the stator blades of the first stage of the high pressure turbine for the purpose of increasing pressure upstream to raise the overall compressor pressure ratios, and also between the stator blades of the first stage of low pressure turbine for the purpose of controlling the speed of the low pressure compressor.

It will be appreciated that while it is convenient to use air as the fluid for providing the jets to decrease the effective area for the passage of gases between turbine stator blades, nevertheless any suitable fluid may be used in place of air for this purpose. If desired, vaporized fuel which is preferably mixed with air may for example be used to provide the aforesaid jets.

I claim as my invention:

1. A gas turbine engine comprising an air compressor; a combustion chamber to which air is supplied by said compressor for combustion therein; a turbine rotor having a plurality of circumferentially spaced blades; a turbine stator having a plurality of circumferentially spaced stator blades disposed upstream of said rotor blades for directing gases from said combustion chamber to said rotor blades for driving said rotor; means for injecting a fluid between said stator blades across the flow passages of said combustion chamber gases between adjacent pairs of stator blades to reduce the effective area of said passages to the flow of said gases; means responsive to the rotational speed of said turbine for controlling the injection of said fluid such that injection is initiated when said turbine speed exceeds a predetermined value; and means responsive to the ambient temperature for increasing and decreasing said predetermined speed when said fluid injection is initiated in response to increase and decrease respectively in said ambient temperature.

2. A gas turbine engine as recited in claim 1 in which said fluid is compressed air obtained from said compressor and in which said fluid-injecting means includes passages within said stator blades with each stator blade having substantially oppositely directed lateral openings for discharging said fluid into the combustion passage on each side of said blade.

3. A gas turbine engine as recited in claim 1 in which said fluid is compressed air obtained from said compressor and in which said fluid-injecting means includes passages disposed between the stator blades for directing said fluid substantially radially into the passages between said stator blades.

References Cited in the file of this patent

UNITED STATES PATENTS

| | | | |
|---|---|---|---|
| 2,336,232 | Doran | Dec. 7, | 1943 |
| 2,422,808 | Stokes | June 24, | 1947 |
| 2,428,830 | | | |
| 2,645,410 | | | |
| 2,651,492 | | | |
| 2,715,814 | | | |
| 2,722,802 | | | |
| 2,738,644 | | | |
| 2,759,549 | | | |
| 2,825,532 | | | |
| | Birmann | Oct. 14, | 1947 |
| | Bauger et al. | July 14, | 1953 |
| | Feilden | Sept. 8, | 1953 |
| | Barr | Aug. 23, | 1955 |
| | Blackwell et al. | Nov. 8, | 1955 |
| | Alford | Mar. 20, | 1956 |
| | Best | Aug. 21, | 1956 |
| | Kadosch et al. | Mar. 27, | 1958 |

FOREIGN PATENTS

| | | | |
|---|---|---|---|
| 130,064 | Australia | Nov. 16, | 1948 |
| 1,030,483 | France | Mar. 11, | 1953 |
| 1,057,271 | France | Oct. 28, | 1953 |